(12) United States Patent
Park

(10) Patent No.: US 10,771,249 B2
(45) Date of Patent: Sep. 8, 2020

(54) APPARATUS AND METHOD FOR PROVIDING SECURE EXECUTION ENVIRONMENT FOR MOBILE CLOUD

(71) Applicant: ELECTRONICS AND TELECOMMUNICATIONS RESEARCH INSTITUTE, Daejeon (KR)

(72) Inventor: Su-Wan Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 211 days.

(21) Appl. No.: 15/818,280

(22) Filed: Nov. 20, 2017

(65) Prior Publication Data

US 2018/0198618 A1  Jul. 12, 2018

(30) Foreign Application Priority Data

Jan. 9, 2017  (KR) .................. 10-2017-0003006

(51) Int. Cl.
*H04L 9/32* (2006.01)
*H04L 9/30* (2006.01)
(Continued)

(52) U.S. Cl.
CPC .......... *H04L 9/3226* (2013.01); *H04L 9/0825* (2013.01); *H04L 9/14* (2013.01);
(Continued)

(58) Field of Classification Search
CPC ....... H04L 9/3226; H04L 9/0825; H04L 9/14; H04L 9/30; H04L 63/0428; H04L 63/06; H04L 9/32; H04L 9/08
See application file for complete search history.

(56) References Cited

U.S. PATENT DOCUMENTS 8,468,584 B1 * 6/2013 Hansen ............... G06Q 40/00
                                                              455/411
9,154,488 B2 * 10/2015 Innes .................... H04L 63/08
                              (Continued)

FOREIGN PATENT DOCUMENTS

KR   10-2010-0107561 A    10/2010
KR      10-1263217 B1     5/2013
                    (Continued)

OTHER PUBLICATIONS

Seo et al, Korean Publication KR20150071196A, p. 5, 10 (machine translation) (Year: 2015).*

*Primary Examiner* — Alexander Lagor
*Assistant Examiner* — Howard H. Louie

(57) ABSTRACT

Disclosed herein are an apparatus and method for providing a secure execution environment for a mobile cloud. The apparatus for providing a secure execution environment includes a general execution unit for, when a request for service execution is received, generating authentication information, transmitting the authentication information to a cloud server, and receiving a security key required for secure communication from the cloud server, and a secure execution unit for verifying the security key received from the general execution unit and performing secure communication with the cloud server by running a service execution monitor when verification succeeds, wherein the general execution unit is configured to transmit the authentication information, including general authentication information corresponding to the general execution unit and secure authentication information received from the secure execution unit, to the cloud server, thus allowing the cloud server to verify the general execution unit and the secure execution unit.

10 Claims, 10 Drawing Sheets

(51) Int. Cl.
   *H04L 9/14* (2006.01)
   *H04L 9/08* (2006.01)
   *H04L 29/06* (2006.01)

(52) U.S. Cl.
   CPC ............ *H04L 9/30* (2013.01); *H04L 63/0428* (2013.01); *H04L 63/06* (2013.01)

(56) References Cited

U.S. PATENT DOCUMENTS

| | | | |
|---|---|---|---|
| 9,800,517 B1* | 10/2017 | Anderson | H04L 47/70 |
| 2002/0154119 A1* | 10/2002 | Lepejian | G06F 9/451 |
| | | | 345/440 |
| 2007/0118733 A1* | 5/2007 | Boogert | H04L 9/0891 |
| | | | 713/155 |
| 2008/0307073 A1* | 12/2008 | Hachimura | H04L 67/025 |
| | | | 709/219 |
| 2010/0248698 A1 | 9/2010 | In et al. | |
| 2011/0093567 A1 | 4/2011 | Jeon et al. | |
| 2015/0237027 A1 | 8/2015 | Kim et al. | |
| 2016/0285628 A1* | 9/2016 | Carrer | H04L 9/3228 |
| 2017/0288858 A1* | 10/2017 | Hirano | G06F 21/6218 |

FOREIGN PATENT DOCUMENTS

| | | |
|---|---|---|
| KR | 10-1265474 B1 | 5/2013 |
| KR | 10-1403626 B1 | 6/2014 |
| KR | 10-2014-0124100 A | 10/2014 |
| KR | 20150071196 A * | 6/2015 |
| KR | 10-1570773 B1 | 11/2015 |
| KR | 10-2016-0102915 A | 8/2016 |

\* cited by examiner

APPARATUS AND METHOD FOR PROVIDING SECURE EXECUTION ENVIRONMENT FOR MOBILE CLOUD

CROSS REFERENCE TO RELATED APPLICATION

This application claims the benefit of Korean Patent Application No. 10-2017-0003006, filed Jan. 9, 2017, which is hereby incorporated by reference in its entirety into this application.

BACKGROUND OF THE INVENTION

1. Technical Field

The present invention relates generally to technology for providing a secure execution environment for a mobile cloud service and, more particularly, to technology for providing a mobile cloud-based service by realizing a secure execution environment for a user terminal.

2. Description of the Related Art

Recently, with the advent and popularization of various smart devices, such as smart phones or tablet personal computers (PCs), and the rapid development of the smart phone market, there occur cases where information is leaked to the outside of the smart devices without a user's agreement due to factors such as the user's carelessness, program bugs, and system vulnerabilities, and various security threats such as battery exhaustion attacks or cross-service attacks have increased.

In particular, sensitive information leakage prevention technology for preventing the leakage of important information to the outside of devices has been actively proposed together with various types of mobile virtualization-based security technologies such as mobile virtualization, ARM TrustZone, and GlobalPlatform. Further, due to various terminal vulnerabilities, technology intending to shift applications and data to a cloud environment and to block the leakage of sensitive information of a user has been developed.

A mobile cloud service is a service that shifts some of tasks and data to be processed by a mobile terminal to a cloud environment and that processes the shifted tasks and data therein due to limitations in computing processing performance of mobile devices, restriction on storage space in the mobile devices, etc.

However, mobile cloud service still entails concerns about service stability and concerns about data security and confidentiality, which are similar to terminal vulnerabilities. Examples of security threats that may occur in representative mobile cloud services that are presented by Cloud Security Alliance (CSA), the National Institute of Standards and Technology (NIST), UC Berkeley, Gartner, etc. may include virtualization vulnerabilities (e.g. malicious code and infringement of service availability), information leakage threats attributable to information commission (separation of possession and management), service failure caused by resource sharing and concentration, information leakage attributable to the wide variety of terminals, difficulty in security application attributable to distributed processing, problems pertaining to rules and regulations, etc.

Therefore, a mobile environment continuously entails the problem of leakage of sensitive data of a user. In order to solve this problem, measures for mobile terminal security and mobile cloud security service are required. In particular, threats, such as the theft of user accounts and services, access by unauthorized terminals, unsecure communication, and malicious use of privileges, may occur between a mobile terminal and a cloud service. Accordingly, the development of security technology for blocking the leakage and loss of sensitive data of a user in a terminal and in a server is required.

PRIOR ART DOCUMENTS

Patent Documents (Patent Document 1) Korean Patent Application Publication No. 10-2014-0124100 (Date of publication: Oct. 24, 2014, entitled "Cloud Based Smartwork Platform of the Total Integrated E-document Management, for the Small and Medium Organization")

SUMMARY OF THE INVENTION

Accordingly, the present invention has been made keeping in mind the above problems occurring in the prior art, and an object of the present invention is to provide a secure execution environment that enables a mobile cloud service to be securely performed on a user terminal.

Another object of the present invention is to enable a secure execution environment application to run via a general execution environment application in the state in which a user is not aware of the change in an execution environment.

A further object of the present invention is to allow a user to securely view a smart-work file even in the state in which a network is blocked, by causing a secure execution unit to manage data on a user terminal.

In accordance with an aspect of the present invention to accomplish the above objects, there is provided an apparatus for providing a secure execution environment for a mobile cloud, including a general execution unit for, when a request for service execution is received, generating authentication information, transmitting the authentication information to a cloud server, and receiving a security key required for secure communication from the cloud server, and a secure execution unit for verifying the security key received from the general execution unit and performing secure communication with the cloud server by running a service execution monitor when verification of the security key succeeds, wherein the general execution unit is configured to transmit the authentication information, including general authentication information corresponding to the general execution unit and secure authentication information received from the secure execution unit, to the cloud server, thus allowing the cloud server to verify the general execution unit and the secure execution unit.

The general execution unit may be configured to generate execution unit information, including secure execution unit information received from the secure execution unit and general execution unit information corresponding to the general execution unit and to transmit registration request information including the execution unit information to the cloud server, thus enabling the apparatus to be registered with the cloud server.

The secure execution unit may be configured to receive registration confirmation information from the general execution unit, decrypt a passcode included in the registration confirmation information, re-encrypt the decrypted passcode, and store the re-encrypted passcode.

The secure authentication information may include the passcode encrypted using a public key of the cloud server.

The secure execution unit may be configured to request the cloud server to store data, receive encrypted data from the cloud server, and decrypt the encrypted data.

The secure execution unit may re-encrypt and store the decrypted data.

The secure execution unit may validate a user authentication code received from the general execution unit and display the data by running a file viewer when validation of the user authentication code succeeds.

The service may be a smart-work service provided by the cloud server.

In accordance with another aspect of the present invention to accomplish the above objects, there is provided a cloud server, including a general communication unit for receiving authentication information from a general execution unit of a secure execution environment provision apparatus, individually verifying the general execution unit and a secure execution unit of the secure execution environment provision apparatus using the authentication information, and transmitting a security key to the general execution unit when verification of the general execution unit and the secure execution unit succeeds, a secure communication unit for performing secure communication with the secure execution unit of the secure execution environment provision apparatus, which has verified the security key received from the general execution unit, and a storage unit for storing data corresponding to a cloud service.

The secure communication unit may be configured to perform secure communication with the secure execution unit that runs a service execution monitor by establishing a secure communication channel with the secure execution unit or by performing data encryption.

The secure communication unit may be configured to, when a data storage request is received from the secure execution unit, transmit the data, which is encrypted using a public key of the secure execution unit, to the secure execution unit.

In accordance with a further aspect of the present invention to accomplish the above objects, there is provided a method for providing a secure execution environment for a mobile cloud, including transmitting, by a general execution unit of a secure execution environment provision apparatus, authentication information that includes secure authentication information and general authentication information to a cloud server, individually verifying, by the cloud server, the general execution unit and a secure execution unit of the secure execution environment provision apparatus, based on the authentication information, transmitting, by the cloud server, a security key required for secure communication to the secure execution unit through the general execution unit when verification of the general execution unit and the secure execution unit succeeds, verifying, by the secure execution unit, the security key and running a service execution monitor, and providing, by the cloud server, a service by performing secure communication with the secure execution unit that runs the service execution monitor.

The method may further include generating, by the general execution unit, execution unit information that includes secure execution unit information received from the secure execution unit and general execution unit information corresponding to the general execution unit, transmitting, by the general execution unit, registration request information including the execution unit information to the cloud server, and receiving, by the general execution unit, registration confirmation information from the cloud server that has completed registration of the secure execution environment provision apparatus.

The method may further include receiving, by the secure execution unit, the registration confirmation information from the general execution unit, decrypting, by the secure execution unit, a passcode included in the registration confirmation information, and re-encrypting and storing, by the secure execution unit, the passcode.

The secure authentication information may include the passcode encrypted using a public key of the cloud server.

The method may further include requesting, by the secure execution unit, the cloud server to store data, receiving encrypted data from the cloud server, and decrypting and storing the encrypted data.

The method may further include validating, by the secure execution unit, a user authentication code received from the general execution unit, and displaying, by the secure execution unit, the data by running a file viewer when validation of the user authentication code succeeds.

The service may be a smart-work service provided by the cloud server.

The cloud server may perform general communication with the general execution unit and performs secure communication with the secure execution unit by establishing a secure communication channel with the secure execution unit or by performing data encryption.

The secure execution environment provision apparatus may display a screen corresponding to any one of the general execution unit and the secure execution unit based on whether the service execution monitor is running.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
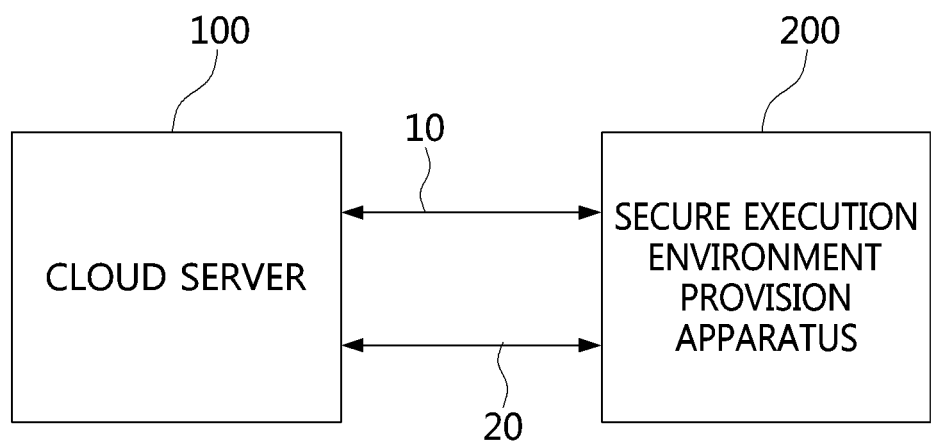
FIG. 1 is a diagram schematically illustrating a system for providing a secure execution environment for a mobile cloud according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a diagram schematically illustrating a system for providing a secure execution environment for a mobile cloud according to an embodiment of the present invention.

As illustrated in FIG. 1, the system for providing a secure execution environment for a mobile cloud according to an embodiment of the present invention includes a cloud server 100 and an apparatus 200 for providing a secure execution environment for a mobile cloud (hereinafter also referred to as a "secure execution environment provision apparatus 200 for a mobile cloud").

First, the cloud server 100 provides a Smart-Work Environment (SWE). The cloud server 100 may dynamically configure a usage environment using pieces of software desired by a user, and cloud services may be classified into Software as a service (SaaS), Platform as a service (PaaS), Hardware as a Service (HaaS), and Infrastructure as a service (IaaS) depending on the properties of the service. Furthermore, the cloud service provided by the cloud server 100 may include all services that can provide a smart-work environment, and may also mean, but is not limited to, cloud service corresponding to such smart work and all services similar thereto.

Further, the cloud server 100 may perform general communication 10 and secure communication 20 with the secure execution environment provision apparatus 200 for a mobile cloud. In particular, the cloud server 100 may perform secure communication with the service execution monitor of the secure execution environment provision apparatus 200 for a mobile cloud, and may transmit encrypted data to the secure execution environment provision apparatus 200 for a mobile cloud.

Next, the secure execution environment provision apparatus 200 for a mobile cloud may be implemented in a form in which it is installed in a user terminal, and may support virtualization functions that allow a user to operate an additional domain separated from a general mobile operating system as a guest operating system domain by utilizing virtualization software such as a hypervisor, a virtualized operating system, or a virtual machine monitor.

Here, the virtualization functions may be classified into a first type (bare-metal type) in which a hypervisor is operated while directly controlling hardware, and a second type (hosted type) in which the hypervisor acts as a process on a host operating system and accesses hardware through the host operating system.

Further, the virtualization functions may be divided into a full-virtualization type in which the entire system is fully virtualized and the Central Processing Unit (CPU), memory, Input/Output (I/O) device, etc. of the system are completely emulated, thus realizing virtualization, and a para-virtualization type in which a virtualized Linux kernel is applied when the system boots, and in which the kernel of a guest operating system is revised and configured to transfer a kernel function to a host kernel when a kernel function is invoked.

The secure execution environment provision apparatus 200 for a mobile cloud according to the embodiment of the present invention does not depend on the above-described virtualization type, and has a structure in which the host operating system invokes a guest operating system-based program. Accordingly, when a request to switch between a general execution unit and a secure execution unit is made, the secure execution environment provision apparatus 200 may be operated based on a function such as virtualization-based Inter-Process Communication (IPC) so that permitted information can be partially moved between execution domains.

The secure execution environment provision apparatus 200 for a mobile cloud may be composed of a general execution unit, by which a general mobile operating system is running based on the hypervisor, and a secure execution unit, by which a lightweight embedded operating system is running in consideration of the characteristics of apparatuses. The general execution unit and the secure execution unit of the secure execution environment provision apparatus 200 for a mobile cloud will be described in detail later with reference to FIG. 3.

Hereinafter, the configuration of a cloud server and an apparatus for providing a secure execution environment for a mobile cloud according to embodiments of the present invention will be described in detail with reference to FIGS. 2 and 3.

Figure 2:
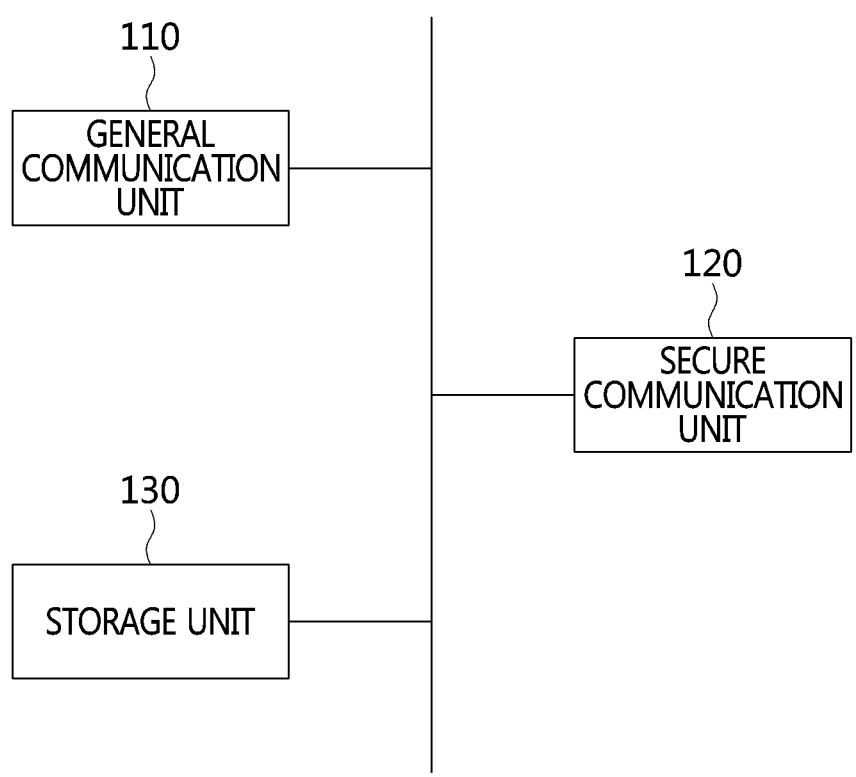
FIG. 2 is a block diagram illustrating the configuration of a cloud server according to an embodiment of the present invention.

FIG. 2 is a block diagram illustrating the configuration of the cloud server according to an embodiment of the present invention.

As illustrated in FIG. 2, the cloud server 100 includes a general communication unit 110, a secure communication unit 120, and a storage unit 130.

First, the general communication unit 110 receives authentication information from the general execution unit of the secure execution environment provision apparatus 200. Here, the authentication information may include general authentication information corresponding to the general execution unit and secure authentication information corresponding to the secure execution unit of the secure execution environment provision apparatus 200.

Also, the general communication unit 110 individually verifies the general execution unit and the secure execution unit of the secure execution environment provision apparatus using the received authentication information. When verification succeeds, the general communication unit 110 may transmit a security key to the general execution unit.

Next, the secure communication unit 120 performs secure communication with the secure execution unit of the secure execution environment provision apparatus 200. Here, the secure communication unit 120 may verify a security key and may perform secure communication with the secure execution unit that runs a service execution monitor.

Further, the secure communication unit 120 may perform secure communication with the secure execution unit by establishing a secure communication channel with the secure execution unit or by performing data encryption, but the type of secure communication is not limited thereto.

Finally, the storage unit 130 may store data about services provided by the cloud server 100. For example, when the cloud server 100 provides a cloud-based smart-work service, the storage unit 130 may store a smart-work file corresponding to the smart-work service.

Figure 3:
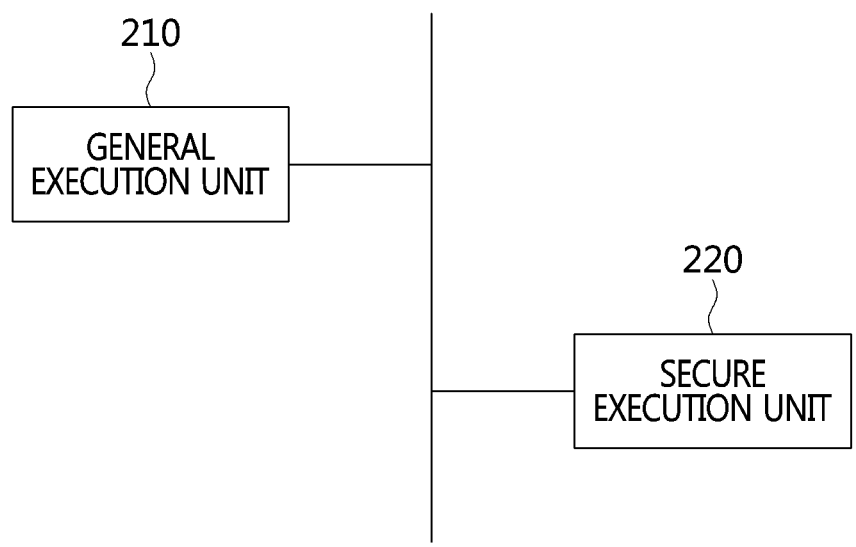
FIG. 3 is a block diagram illustrating the configuration of an apparatus for providing a secure execution environment for a mobile cloud according to an embodiment of the present invention.

FIG. 3 is a block diagram illustrating the configuration of an apparatus for providing a secure execution environment for a mobile cloud according to an embodiment of the present invention.

As illustrated in FIG. 3, the secure execution environment provision apparatus 200 for a mobile cloud includes a general execution unit 210 for executing a general mobile operating system and a secure execution unit 220 for executing a separate embedded operating system.

First, the general execution unit 210 may register the secure execution environment provision apparatus 200 for a mobile cloud with the cloud server 100 by performing general communication with the cloud server 100 in order to execute a cloud-based service from the cloud server 100.

Here, the general execution unit 210 generates apparatus information using both secure execution unit information received from the secure execution unit 220 and general execution unit information corresponding to the general execution unit 210. Further, the general execution unit 210 transmits registration request information including the generated apparatus information to the cloud server 100.

Also, the general execution unit 210 may receive registration confirmation information as a response to the registration request information. The general execution unit 210, having received the registration confirmation information, may transmit the registration confirmation information to the secure execution unit 220. Here, the general execution unit 210 may verify a server authentication value and a signature using the received registration confirmation information, and may forward the registration confirmation information to the secure execution unit 220 after verification has been performed.

The general execution unit 210 requests the use of a service execution application from the secure execution unit 220, and receives secure authentication information from the secure execution unit 220. The general execution unit 210 generates authentication information using the secure authentication information and general authentication information corresponding to the general execution unit 210, and transmits the generated authentication information to the cloud server 100.

When the verification of the apparatus has been successfully completed, the general execution unit 210 receives a security key from the cloud server 100 and transmits the security key to the secure execution unit 220. In this way, the general execution unit 210 allows the secure execution unit 220 to provide the service of the cloud server 100 to the user while performing general communication with the cloud server 100.

Next, when desiring to register the secure execution environment provision apparatus 200 for a mobile cloud with the cloud server 100, the secure execution unit 220 generates secure execution information and transmits the secure execution information to the general execution unit 210. Further, the secure execution unit 220 receives registration confirmation information from the cloud server 100 through the general execution unit 210 and decrypts and stores a passcode contained in the registration confirmation information. Here, the secure execution unit 220 may re-encrypt the decrypted passcode using the encryption function of the secure execution unit 220, and may store the re-encrypted passcode.

When the request to use the service execution application is received from the general execution unit 210, the secure execution unit 220 generates secure authentication information and transmits the secure authentication information to the general execution unit 210.

The secure execution unit 220 receives a security key from the cloud server 100 through the general execution unit 210. The secure execution unit 220 verifies the received security key and performs secure communication with the cloud server 100 by running a service execution monitor when verification succeeds.

The secure execution unit 220 may request the cloud server 100 to store data corresponding to a service by performing secure communication with the cloud server 100. Also, the secure execution unit 220 may receive encrypted data from the cloud server 100, may decrypt the encrypted data, may re-encrypt the decrypted data using the encryption function of the secure execution unit 220, and may store the re-encrypted data.

Meanwhile, the secure execution environment provision apparatus 200 for a mobile cloud may display a screen corresponding to any one of the general execution unit 210 and the secure execution unit 220, and may provide the screen to the user. Here, the secure execution environment provision apparatus 200 for a mobile cloud may display the screen corresponding to any one of the general execution unit 210 and the secure execution unit 220 based on whether the service execution monitor of the secure execution unit is running.

Hereinafter, a method for providing a secure execution environment for a mobile cloud according to an embodiment of the present invention will be described in detail with reference to FIG. 4.

Figure 4:
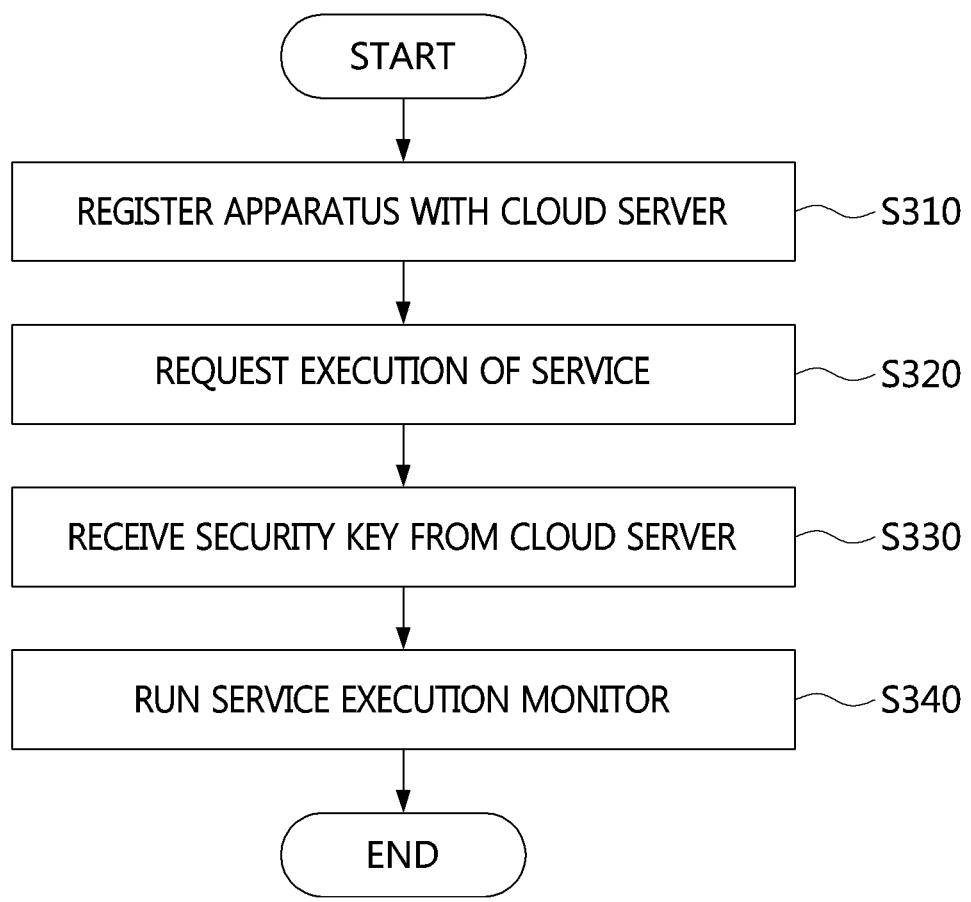
FIG. 4 is a flowchart for explaining a method for providing a secure execution environment for a mobile cloud according to an embodiment of the present invention.

FIG. 4 is a flowchart for explaining a method for providing a secure execution environment for a mobile cloud according to an embodiment of the present invention.

The secure execution environment provision apparatus 200 for a mobile cloud registers the secure execution environment provision apparatus 200 with the cloud server at step S310.

The secure execution environment provision apparatus 200 for a mobile cloud generates apparatus information using general execution unit information corresponding to the general execution unit 210 and secure execution unit information corresponding to the secure execution unit 220. Further, the secure execution environment provision apparatus 200 for a mobile cloud transmits registration request information including the generated apparatus information to the cloud server 100.

Further, the secure execution environment provision apparatus 200 for a mobile cloud receives registration confirmation information as a response to the registration request information from the cloud server 100. Here, the secure execution environment provision apparatus 200 for a mobile cloud may verify a server authentication value and a signature using the registration confirmation information.

At step S310, the secure execution environment provision apparatus 200 for a mobile cloud may perform general communication with the cloud server 100, and may perform communication with the cloud server 100 through the general execution unit 210 of the secure execution environment provision apparatus 200. Also, the secure execution unit 220 of the secure execution environment provision apparatus 200 for a mobile cloud may communicate with the general execution unit 210.

Further, a procedure in which the secure execution environment provision apparatus 200 for a mobile cloud registers the corresponding apparatus 200 with the cloud server 100 at step S310 will be described in detail later with reference to FIG. 5.

Then, the secure execution environment provision apparatus 200 for a mobile cloud requests execution of a service from the cloud server 100 at step S320.

The secure execution environment provision apparatus 200 for a mobile cloud may request execution of service by transmitting authentication information, which is generated using secure authentication information and general authentication information, to the cloud server 100.

In particular, when the service is a smart-work service, the secure execution environment provision apparatus 200 for a mobile cloud may request execution of the smart-work service. Although the cloud server 100 has been described as providing a cloud-based smart-work service for the convenience of description, the type of service provided by the cloud server 100 is not limited thereto.

Next, the secure execution environment provision apparatus 200 for a mobile cloud receives a security key from the cloud server 100 at step S330.

When the cloud server 100 succeeds in verifying the received authentication information at step S320, the secure execution environment provision apparatus 200 for a mobile cloud may receive a verification success code and a security key from the cloud server 100. Here, the secure execution environment provision apparatus 200 for a mobile cloud may receive the security key from the cloud server 100 through the general execution unit 210, and may forward the received security key to the secure execution unit 220.

Finally, the secure execution environment provision apparatus 200 for a mobile cloud provides a cloud-based service to the user by running a service execution monitor at step S340.

The secure execution unit 220 of the secure execution environment provision apparatus 200 for a mobile cloud may verify the received security key and may perform secure communication with the cloud server 100 by running the service execution monitor when verification has succeeded. In this case, when the service provided by the cloud server 100 is a cloud-based smart-work service, the secure execution unit 220 may perform secure communication by running the smart-work execution monitor.

Further, the secure execution environment provision apparatus 200 for a mobile cloud may perform communication with the cloud server 100 through an encryption channel or may perform communication based on data encryption, but the type of secure communication is not limited thereto.

Hereinafter, the operating procedure of a system for providing a secure execution environment for a mobile cloud according to an embodiment of the present invention will be described in detail with reference to FIGS. 5 to 8.

In FIGS. 5 to 8, it is illustrated that a smart-work service means one of cloud-based smart-work services provided by the cloud server 100 and that the secure execution environment provision apparatus 200 for a mobile cloud provides the smart-work service provided by the cloud server 100 to a user.

Figure 5:
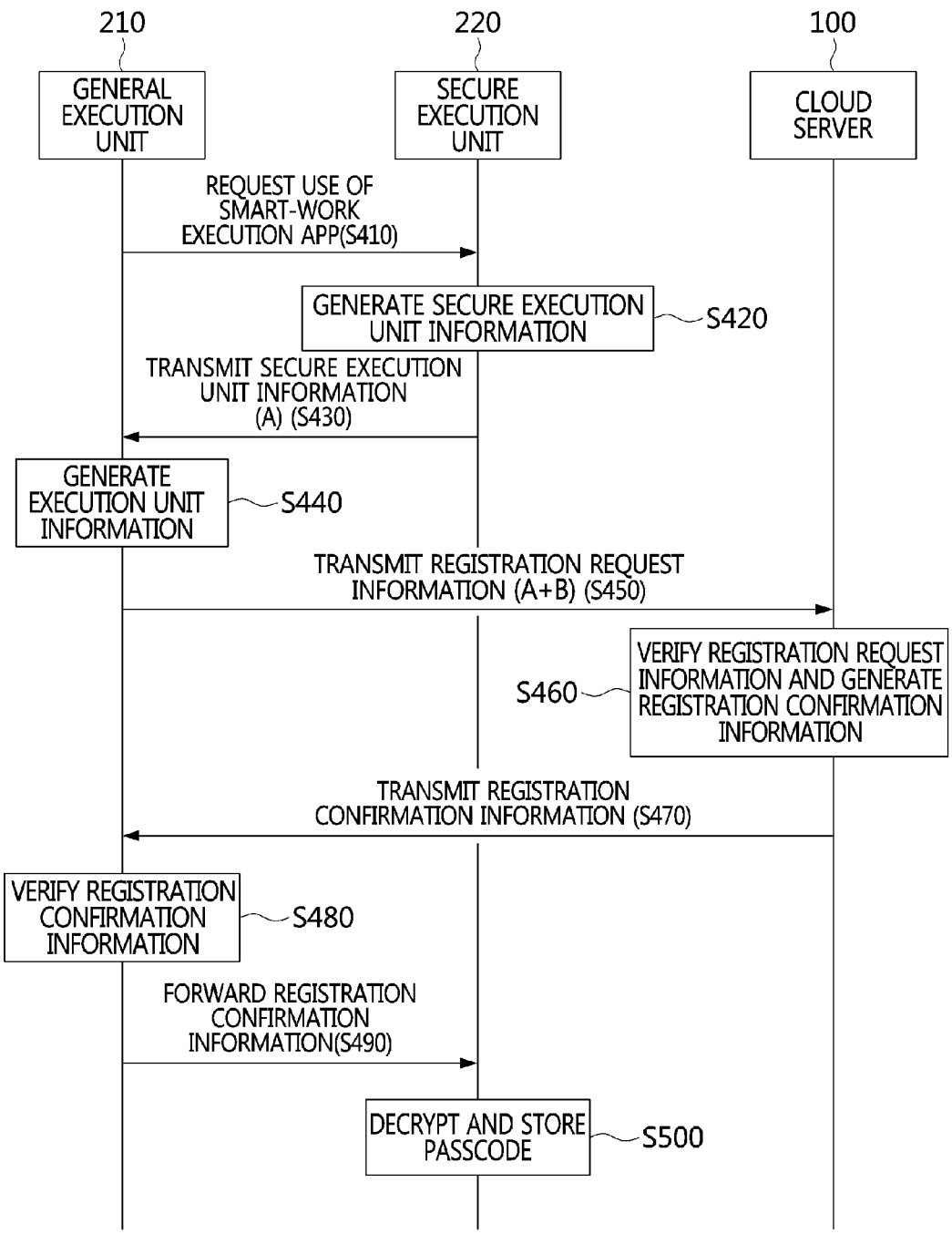
FIG. 5 is a flowchart for explaining an apparatus registration procedure performed by the apparatus for providing a secure execution environment for a mobile cloud according to an embodiment of the present invention.

FIG. 5 is a flowchart illustrating an apparatus registration procedure performed by the apparatus for providing a secure execution environment for a mobile cloud according to an embodiment of the present invention.

First, the general execution unit 210 requests the use of a smart-work execution application from the secure execution unit 220 at step S410.

The general execution unit 210 includes a secure execution-supporting application that supports the running of the smart-work execution application of the secure execution unit 220. When a request to run the secure execution-supporting application in a general execution environment domain is received from the user, the general execution unit 210 transfers the request to run the smart-work execution application to the secure execution unit 220 through the Inter-Process Communication (IPC) of a hypervisor.

At this time, when the smart-work execution application of the secure execution unit 220 is initially launched, the procedure of FIG. 5, which registers the secure execution environment provision apparatus 200 for a mobile cloud so that the apparatus 200 may be connected to the cloud server 100, may be performed. In contrast, when the smart-work execution application of the secure execution unit 220 is not initially launched or when the cloud server 100 has already been registered with the cloud server 100, the secure execution environment provision apparatus 200 for a mobile cloud may perform the procedure of FIG. 6.

The secure execution unit 220 generates secure execution unit information at step S420, and transmits the generated secure execution unit information to the general execution unit 210 at step S430.

The secure execution unit 220 generates secure execution unit information A, which is required by the secure execution environment provision apparatus 200 to be registered with the cloud server 100. Here, the secure execution unit information A may be configured as A={terminal ID (ID$_{SEE}$), random number (N$_{SEE}$), certificate (Cert$_{SEE}$), signature value (Sign$_{SEE}$(ID$_{SEE}$, N$_{SEE}$))}.

Here, the certificate refers to a certificate that is assigned to the secure execution unit 220, and may be implemented using a terminal ID, a serial number, a Media Access Control (MAC) address, etc., which are assigned at the time of a factory reset. Further, the secure execution unit 220 may generate an encrypted unique value corresponding to the secure execution unit 220 using an encryption key in a secure execution domain and may use the encrypted unique value.

The general execution unit 210, having received the secure execution unit information A, generates general execution unit information B corresponding to the general execution unit 210, and generates execution unit information using both the general execution unit information B and the secure execution unit information A at step S440.

Here, the general execution unit information B may be configured as B={terminal ID ($ID_{GEE}$), certificate ($Cert_{GEE}$), signature value ($Sign_{GEE}(ID_{GEE}, A)$)}.

Further, the general execution unit 210 generates registration request information including the generated execution unit information and transmits the registration request information to the cloud server 100 at step S450.

In detail, the general execution unit 210 may generate registration request information including the execution unit information (A+B) that is generated using both the secure execution unit information A and the general execution unit information B, and may transmit the generated registration request information to the cloud server 100.

Next, the cloud server 100 verifies the received registration request information and generates registration confirmation information at step S460, and transmits the generated registration confirmation information to the general execution unit 210 at step S470.

Here, the registration confirmation information may include a server authentication value C, which may be configured as C={random number ($N_{CS}$), $E_{PU\_SEE}$(Passcode), certificate ($Cert_{CS}$), signature value ($Sign_{CS}(N_{CS}, E_{PU\_SEE}(Passcode))$)}.

Here, the passcode may be used as an access permission code for permitting the secure execution unit 220 to access the cloud server 100, and $E_{PU\_SEE}$ may mean public key encryption (cryptosystem) using the certificate of the secure execution unit 220.

Further, the general execution unit 210 verifies the received registration confirmation information at step S480 and forwards the registration confirmation information to the secure execution unit 220 at step S490.

The general execution unit 210 may verify the server authentication value C and the signature value ($Sign_{CS}(N_{CS}, E_{PU\_SEE}(Passcode))$) of the registration confirmation information and may forward the registration confirmation information received from the cloud server 100 to the secure execution unit 220 when verification has been successfully completed.

The secure execution unit 220, having received the registration confirmation information, decrypts and stores the passcode included in the registration confirmation information at step S500.

The secure execution unit 220 verifies the received registration confirmation information and decrypts the information $E_{PU\_SEE}$(Passcode). Here, the secure execution unit 220 may re-encrypt the decrypted passcode using the encryption function of the secure execution unit 220, and may store the re-encrypted passcode. The secure execution unit 220 may re-encrypt the passcode using an encrypted file system, such as a Filesystem in Userspace (FUSE), a Cryptographic File System (CFS), or Crypts, which is a security function provided by the secure execution unit 220, and may store the re-encrypted passcode.

Figure 6:
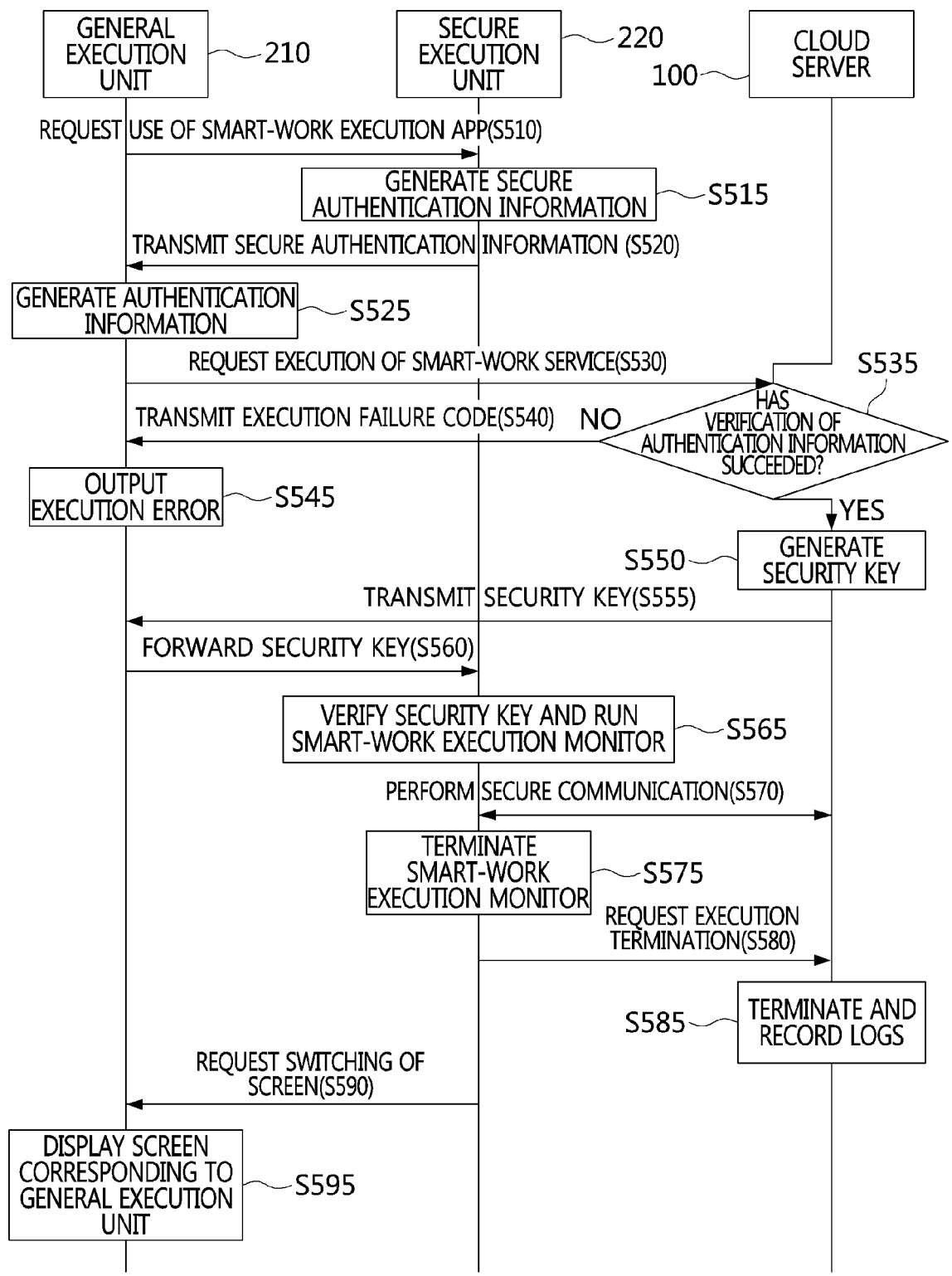
FIG. 6 is a flowchart for explaining a procedure for running and terminating the smart-work execution monitor of the apparatus for providing a secure execution environment for a mobile cloud according to an embodiment of the present invention.

FIG. 6 is a flowchart for explaining a procedure for running and terminating the smart-work execution monitor of the apparatus for providing a secure execution environment for a mobile cloud according to an embodiment of the present invention.

First, the general execution unit 210 requests the use of a smart-work execution application from the secure execution unit 220 at step S510.

Then, the secure execution unit 220 generates secure authentication information at step S515 and transmits the generated secure authentication information to the general execution unit 210 at step S520.

In order to run a smart-work execution monitor in response to the request from the general execution unit 210, the secure execution unit 220 may decrypt the passcode stored in the apparatus registration procedure and may re-encrypt the passcode using the public key of the cloud server 100 ($E_{PU\_CS}$(Passcode)). The secure execution unit 220 may generate secure authentication information D as D={$ID_{SEE}$, $Sign_{SEE}(ID_{SEE}, E_{PU\_CS}$(Passcode))}, and may transmit the secure authentication information, together with a smart-work execution request, to the general execution unit 210.

The general execution unit 210, having received the secure authentication information, generates general authentication information corresponding to the general execution unit 210, and generates authentication information using both the secure authentication information and the general authentication information at step S525. Further, the general execution unit 210 transmits an execution request for a smart-work service, including the generated authentication information, to the cloud server 100 at step S530.

In detail, the general execution unit 210 may generate general authentication information E using the secure authentication information D, and may transmit authentication information, which includes the secure authentication information D and the general authentication information E, together with the smart-work execution request, to the cloud server 100. Here, the general authentication information E may be configured as E={$ID_{GEE}$, $Sign_{GEE}(ID_{GEE}, A)$}.

The cloud server 100 verifies the authentication information received from the general execution unit 210 at step S535.

The cloud server 100 may verify respective signature values of the secure authentication information D and the general authentication information E, decrypt the passcodes, compare the passcodes with information of the previously registered apparatus, and then check whether the verification of the apparatus has been successfully completed.

When the verification of the apparatus fails, the cloud server transmits an execution failure code to the general execution unit 210 at step S540. Then, the general execution unit 210 outputs an execution error at step S545.

In contrast, when the verification of the apparatus succeeds, the cloud server 100 generates a security key at step S550 and transmits the generated security key to the general execution unit 210 at step S555.

The cloud server 100 may encrypt a verification success code and a security key required for secure communication ($E_{PU\_GEE}(E_{PU\_SEE}$(Secure Communication Key))), and may transmit the encrypted verification success code and security key to the general execution unit 210.

Further, the general execution unit 210 may forward the received security key to the secure execution unit 220 at step S560.

Here, the general execution unit 210 may decrypt the received security key ($E_{PU\_GEE}(E_{PU\_SEE}$(Secure Communication Key))), and may forward the decrypted security key to the secure execution unit 220.

Next, the secure execution unit 220 verifies the received security key and runs the smart-work execution monitor when verification succeeds at step S565. The secure execution unit 220 performs secure communication with the cloud server 100 by running the smart-work execution monitor at step S570.

Here, the smart-work execution monitor may refer to the service execution monitor of the secure execution environment provision apparatus 200 for a mobile cloud, and, especially, a service execution monitor for performing secure communication with the cloud server 100 that provides smart-work services.

Here, the secure execution unit 220 may decrypt and verify the received security key. When verification succeeds, the secure execution unit 220 may run the smart-work execution monitor to switch the user screen of the secure execution environment provision apparatus 200 for a mobile cloud.

Further, the secure execution unit 220 may establish a secure communication channel (e.g. Virtual Private Network: VPN) or set the performance of data encryption so that communication with the cloud server 100 can be securely performed using the security key. By means of this, the user of the secure execution environment provision apparatus 200 for a mobile cloud may be provided with a secure and reliable smart-work service based on the cloud server 100.

Furthermore, when execution of the smart-work service is terminated, the secure execution unit 220 terminates the smart-work execution monitor at step S575 and requests the termination of execution from the cloud server 100 at step S580. The cloud server 100, having received the execution termination request, terminates secure communication and records logs at step S585.

Next, when the smart-work execution monitor is terminated, the secure execution unit 220 requests the general execution unit 210 to switch the screen at step S590. The general execution unit 210 may control a screen display unit so that the screen corresponding to the general execution unit 210 is displayed at step S595.

At step S595, the general execution unit 210 may switch the execution environment to an environment for a general application or a mobile operating system that is running in a general execution environment domain, and may provide the switched execution environment to the user.

Figure 7:
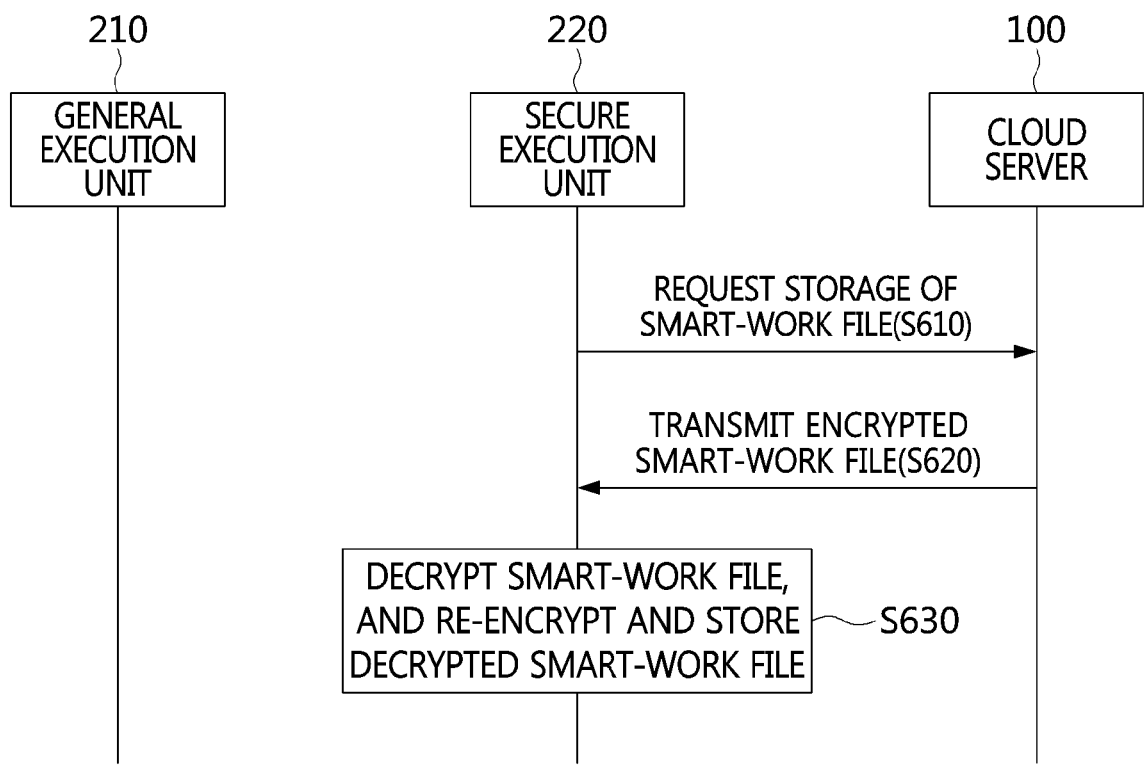
FIG. 7 is a flowchart for explaining a smart-work file storage procedure performed by the apparatus for providing a secure execution environment for a mobile cloud according to an embodiment of the present invention.

FIG. 7 is a flowchart for explaining a smart-work file storage procedure performed by the apparatus for providing a secure execution environment for a mobile cloud according to an embodiment of the present invention.

During a procedure for performing secure communication, the secure execution unit 220 requests the cloud server 100 to store a smart-work file at step S610.

When the user desires to store a document in a user terminal while working on the document in the cloud via a smart-work execution monitor, the secure execution unit 220 may request the cloud server 100 to store the smart-work file.

Here, the secure execution unit 220 may perform secure communication with the cloud server 100, and may request the cloud server 100 to store the smart-work file by establishing an encryption channel or by performing communication based on data encryption.

Then, the cloud server 100 transmits an encrypted smart-work file to the secure execution unit 220 at step S620.

The cloud server 100 generates the encrypted smart-work file ($E_{PU\_SEE}$(File)) and transmits the encrypted smart-work file to the secure execution unit 220.

Further, the secure execution unit 220 decrypts the encrypted smart-work file ($E_{PU\_SEE}$(File)). Also, the secure execution unit 220 may re-encrypt the decrypted smart-work file using the encryption function of the secure execution unit 220 and may store the re-encrypted file at step S630. Here, the encryption function may refer to a secure storage function that includes an encrypted file system in the secure execution unit 220.

Figure 8:
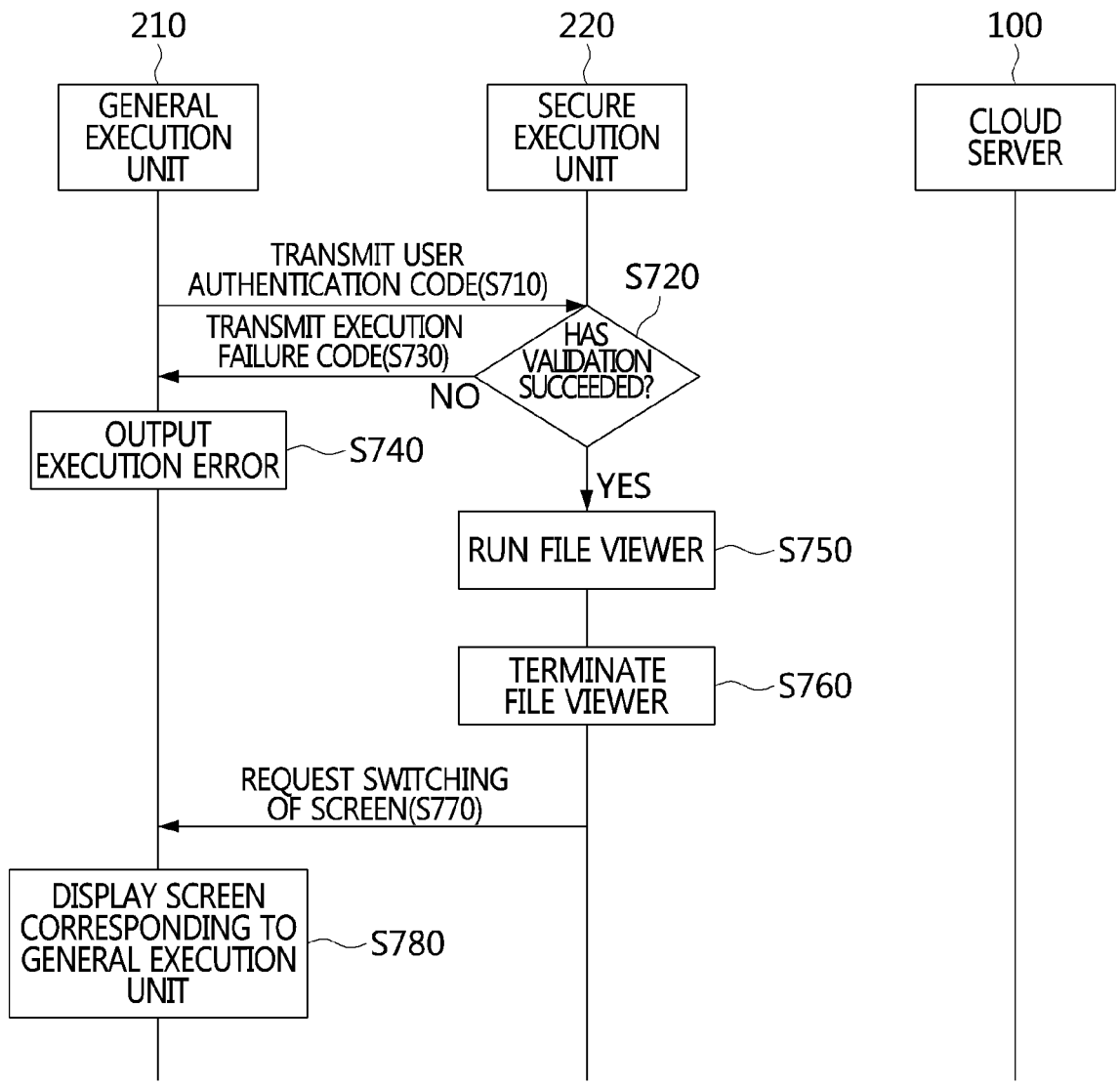
FIG. 8 is a flowchart for explaining a smart-work file output procedure performed by the apparatus for providing a secure execution environment for a mobile cloud according to an embodiment of the present invention.

FIG. 8 is a flowchart for explaining a smart-work file output procedure performed by the apparatus for providing a secure execution environment for a mobile cloud according to an embodiment of the present invention.

The general execution unit 210 transmits a user authentication code to the secure execution unit 220 at step S710.

When the user desires to view a smart-work file stored in the secure execution unit 220, the user may input a request to run a secure execution-supporting application in a general execution environment domain. Further, the general execution unit 210, having received the request to run the secure execution-supporting application, may request the use of a smart-work execution application from the secure execution unit 220.

Here, the procedure in which the general execution unit 210 requests the use of the smart-work execution application from the secure execution unit 220 may be substantially identical to step S410 of FIG. 5, and thus a repeated description thereof will be omitted.

Further, the secure execution unit 220, having received the request for the use of the smart-work execution application, may authenticate both the user and the secure execution-supporting application, and may request the general execution unit 210 to input a user authentication code.

In this case, in order to use the smart-work execution application of the secure execution unit 220, there is required a procedure for checking whether the user who requested the use of the application and the secure execution-supporting application are an authorized user and an authorized application, respectively. Therefore, after performing authentication based on a Personal Identification Number (PIN), a certificate, etc., the secure execution unit 220 may request the general execution unit 210 to input a user authentication code.

Then, the secure execution unit 220, having received the user authentication code, validates the user authentication code at step S720.

When the general execution unit 210 transmits the user authentication code to the secure execution unit 220, the secure execution unit 220 validates the user authentication code.

When validation of the user authentication code fails, the secure execution unit 220 transmits an execution failure code to the general execution unit 210 at step S730, and the general execution unit 210 outputs an execution error corresponding to the execution failure code at step S740.

In contrast, when validation of the user authentication code succeeds, the secure execution unit 220 allows the user to use the smart-work service by running a file viewer at step S750.

When validation of the user authentication code succeeds, the secure execution unit 220 switches a user screen to the screen corresponding to the secure execution unit 220 by running the file viewer. The user may use a secure storage function for the smart-work file using the file viewer.

Here, as smart-work files managed by the secure execution unit 220 are managed by the encrypted file system, they are read from physical memory though a decryption procedure and an encryption procedure during read and re-store operations. That is, the smart-work files may be physically, securely managed.

Further, when the file viewer is terminated at step S760, the secure execution unit 220 may request the general execution unit 210 to switch the screen at step S770, and the general execution unit 210 may control the screen display unit so that the screen corresponding to the general execution unit 210 is displayed at step S780.

Here, the screen corresponding to the general execution unit 210 may refer to a screen corresponding to a general application or a mobile operating system that is running in the general execution environment domain.

When the general execution unit 210 of the secure execution environment provision apparatus 200 for a mobile cloud according to the embodiment of the present invention requests the use of a smart-work execution application, the actual smart-work execution application is run by the secure execution unit 220. Here, the secure execution environment provision apparatus 200 for a mobile cloud may immediately run the smart-work execution application so that the user feels as if the application were running in the same environment.

Furthermore, the secure execution unit 220 performs a security function in a domain that is unrecognizable by the user, by which the applications included in the secure execution unit 220 may be supported. Therefore, the applications and security functions included in the secure execution unit 220 may be extended if necessary.

Hereinafter, the configuration of an apparatus for providing a secure execution environment for a mobile cloud according to another embodiment of the present invention will be described in detail with reference to FIG. 9.

Figure 9:
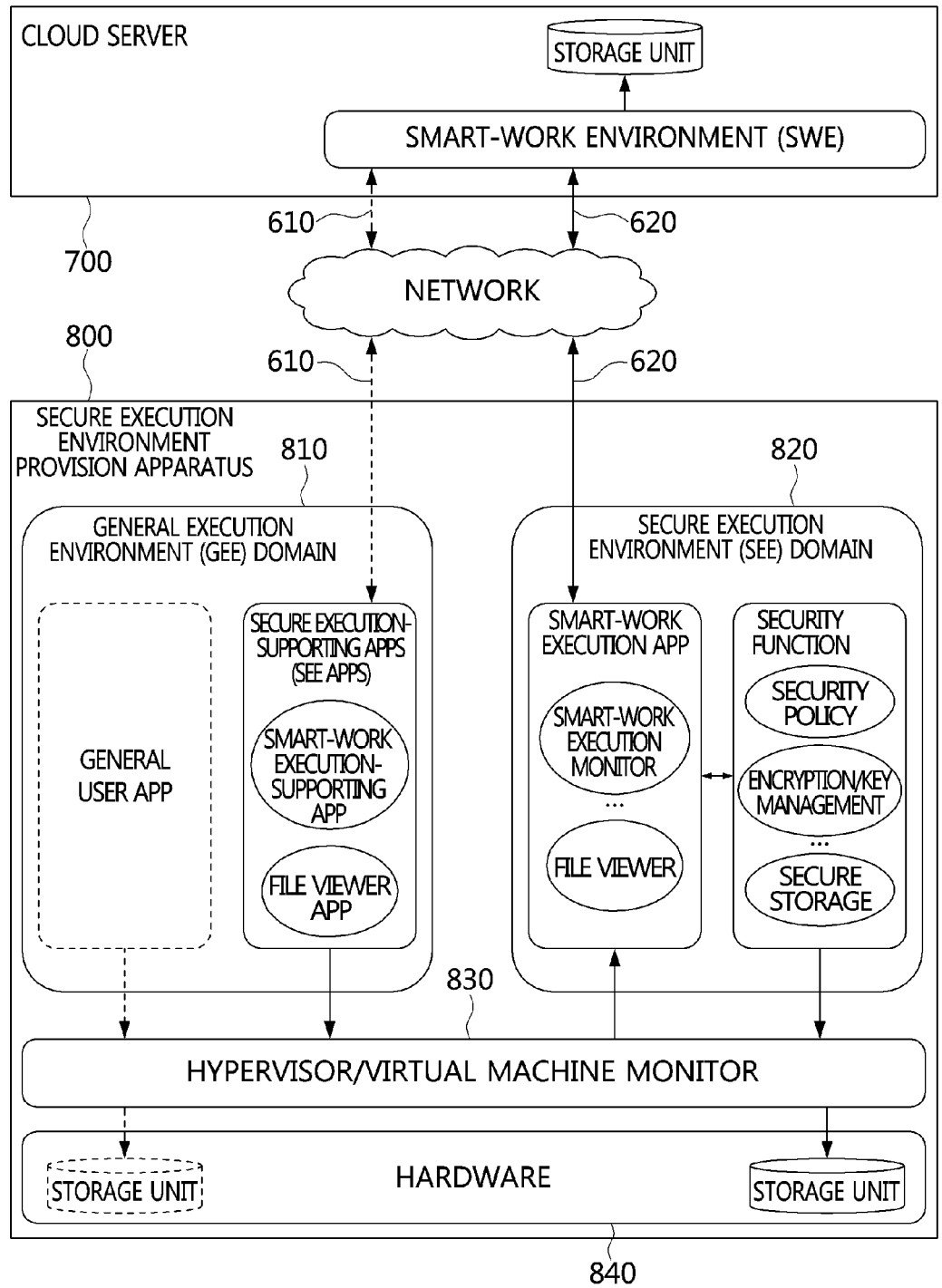
FIG. 9 is a diagram illustrating an example of implementation of an apparatus for providing a secure execution environment for a mobile cloud according to an embodiment of the present invention.

FIG. 9 is a diagram illustrating an example of implementation of an apparatus for providing a secure execution environment for a mobile cloud according to an embodiment of the present invention.

As illustrated in FIG. 9, a cloud server 700 and an apparatus 800 for providing a secure execution environment for a mobile cloud are connected to each other over a network, and perform general communication 610 and secure communication 620 with each other.

Further, the secure execution environment provision apparatus 800 for a mobile cloud may include a general execution unit 810, a secure execution unit 820, a hypervisor/virtual machine monitor 830, and hardware 840. The general execution unit 810 manages a General Execution Environment (GEE) domain in which a general mobile operating system is running. The secure execution unit 820 manages a Secure Execution Environment (SEE) domain in which a lightweight embedded operating system is running in consideration of the characteristics of the apparatus. Further, respective execution environment domains may access the hardware 840 through the hypervisor 830.

In this case, a lightweight operating system such as Android, Free Real-Time Operating System (FreeRTOS), or Micrium (uC/OS-II, III) may be selectively applied to and run in the secure execution environment domain.

The General Execution Environment (GEE) domain corresponding to the general execution unit 810 includes general user applications (general user apps) and secure execution-supporting applications (i.e. SEE apps), wherein the secure execution-supporting applications (SEE apps) may include a smart-work execution-supporting application and a file viewer application (i.e. smart-work viewer app).

The general user apps may refer to mobile operating system-based applications, and the secure execution-supporting applications (SEE apps) may refer to smart-work-related execution applications that are executed on the secure execution unit 820. That is, the secure execution-supporting applications (SEE apps) may refer to applications that support actual applications so that, among applications included in the secure execution unit 820, actual applications connected to the cloud server 700 may run.

Further, the secure execution environment (SEE) domain corresponding to the secure execution unit 820 may include smart-work execution applications (apps), and the smart-work execution apps may include a smart-work execution monitor, a file viewer, etc.

The smart-work execution monitor allows the secure execution environment provision apparatus 800 for a mobile cloud to use the smart-work environment provided by the cloud server 700, and the file viewer may mean a document viewer and/or an image viewer. Further, the secure execution environment domain (SEE) domain may provide security functions such as a security policy, encryption/key management, and secure storage.

The data flow of the secure execution environment provision apparatus 800 for a mobile cloud may be chiefly divided into a data flow in the secure execution environment provision apparatus 800 for a mobile cloud and a data flow between the secure execution environment provision apparatus 800 for a mobile cloud and the cloud server 700.

The data flow between the secure execution environment provision apparatus 800 for a mobile cloud and the cloud server 700 may be divided into a data flow for general communication (general channel network) 610 between the general execution unit 810 and the cloud server 700 and data flow for secure communication (secure channel network) 620 between the secure execution unit 820 and the cloud server 700.

Further, processes in the secure execution environment provision apparatus 800 for a mobile cloud may be divided into an existing mobile operating system process (inner GEE process) 630, such as Android, and a secure execution process (inner SEE process) 640 depending on whether a secure execution-supporting application is running.

As described above, the secure execution environment provision apparatus for a mobile cloud according to the embodiments of the present invention may prevent the leakage of data from a user terminal or the illegal monitoring of the data due to malicious applications or malicious code (malware) by providing a mobile cloud service through the secure execution unit.

Further, the secure execution environment provision apparatus for a mobile cloud allows applications provided in a secure execution environment domain to be run by an application provided in a general execution environment domain, thus allowing the user to use the applications without being aware of changes attributable to switching between execution environments.

Furthermore, the secure execution environment provision apparatus for a mobile cloud may be registered with a cloud server by performing authentication not only on a general execution domain, but also on a secure execution domain, and may be permitted to access the cloud server by performing a procedure for verifying a passcode issued from the cloud server during registration. By means of this, only the authorized secure execution environment provision apparatus for a mobile cloud may perform secure communication with the cloud server, and may guarantee the security of user input and data.

Furthermore, a smart-work file present on the cloud server may be permitted to be stored in the secure execution environment provision apparatus for a mobile cloud, which is a user terminal, and may be securely managed in the secure execution environment provision apparatus for a mobile cloud using the security function in a secure execution domain, thus preventing the leakage of data and permitting the user to securely check data in the secure execution environment provision apparatus for a mobile cloud even in the situation in which a network is blocked.

Figure 10:
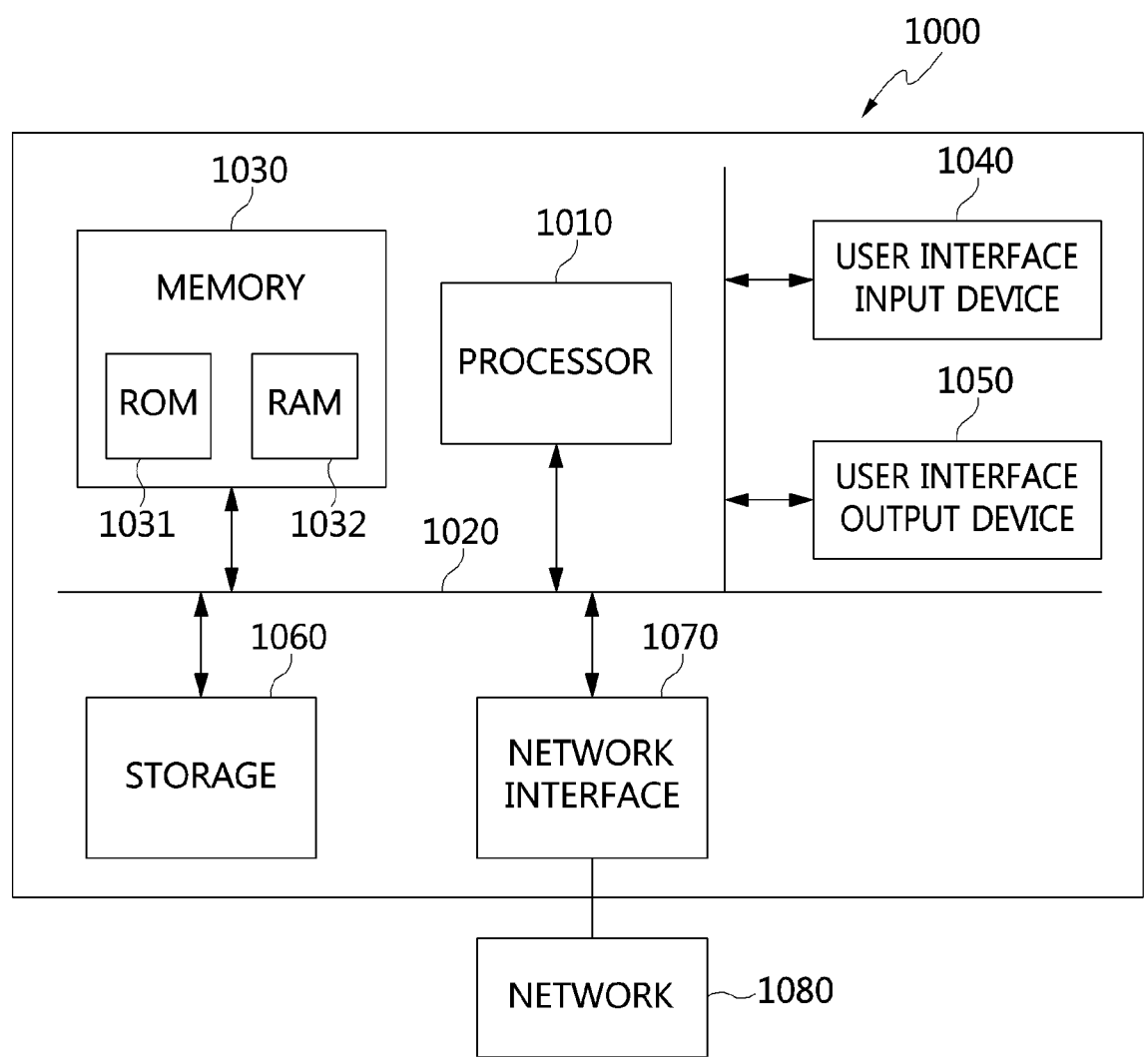
FIG. 10 is a block diagram illustrating a computer system according to an embodiment of the present invention.

FIG. 10 is a block diagram illustrating a computer system according to an embodiment of the present invention.

Referring to FIG. 10, an embodiment of the present invention may be implemented in a computer system 1000 such as a computer-readable storage medium. As shown in FIG. 10, the computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing processing instructions stored in the memory 1030 or the storage 1060. Each of the memory 1030 and the storage 1060 may be any of various types of volatile or nonvolatile storage media. For example, the memory 1030 may include Read-Only Memory (ROM) 1031 or Random Access Memory (RAM) 1032.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, there may be provided a secure execution environment that allows a mobile cloud service to be securely performed on a user terminal.

In accordance with the present invention, a secure execution environment application may run through a general execution environment application in the state in which a user is not aware of switching between execution environments.

In accordance with the present invention, a secure execution unit manages data on a user terminal, thus allowing the user to securely check a smart-work file even when the network is blocked.

As described above, in the apparatus and method for providing a secure execution environment for a mobile cloud according to the present invention, the configurations and schemes in the above-described embodiments are not limitedly applied, and some or all of the above embodiments can be selectively combined and configured so that various modifications are possible.

What is claimed is:

1. An apparatus for providing a secure execution environment for a mobile cloud, the apparatus comprising:
a general executor to register the apparatus with a cloud server by generating executor information, including secure executor information received from a secure executor and general executor information corresponding to the general executor, transmit registration request information including the executor information to the cloud server, and receive registration confirmation information from the cloud server, and, when a request for service execution is received, generate authentication information, transmit the authentication information to the cloud server, and receive a security key required for secure communication from the cloud server; and
the secure executor to verify the security key received from the general executor and perform the secure communication with the cloud server by running a service execution monitor when verification of the security key succeeds,
wherein the general executor generates general authentication information corresponding to the general executor, and transmits the authentication information, including the general authentication information and secure authentication information received from the secure executor, to the cloud server, thus allowing the cloud server to verify the general executor and the secure executor using the authentication information,
wherein the apparatus is installed in a user terminal,
wherein the secure executor requests the cloud server to store data, receives encrypted data from the cloud server, and decrypts the encrypted data,
wherein the secure executor receives the registration confirmation information from the general executor, decrypts a passcode included in the registration confirmation information, re-encrypts the decrypted passcode, and stores the re-encrypted passcode, and
wherein the secure authentication information includes the passcode encrypted using a public key of the cloud server.

2. The apparatus of claim 1, wherein the secure executor re-encrypts and stores the decrypted data.

3. The apparatus of claim 1, wherein the secure executor validates a user authentication code received from the general executor and displays the data by running a file viewer when validation of the user authentication code succeeds.

4. The apparatus of claim 1, wherein the service is a smart-work service provided by the cloud server.

5. A cloud server, comprising:
a general communicator to receive authentication information from a general executor of a secure execution environment provision apparatus installed in a user terminal, individually verify the general executor and a secure executor of the secure execution environment provision apparatus using the authentication information, and transmit a security key required for secure communication to the general executor when verification of the general executor and the secure executor succeeds;
a secure communicator to perform the secure communication with the secure executor of the secure execution environment provision apparatus when the secure executor has verified the security key received from the general executor; and
a storage to store data corresponding to a cloud service,
wherein the general executor generates the authentication information that includes general authentication information corresponding to the general executor and generated by the general executor and secure authentication information received from the secure executor,
wherein the cloud server registers the secure execution environment provision apparatus by receiving registration request information including executor information, including secure executor information corresponding to the secure executor and general executor information corresponding to the general executor, from the general executor and transmitting registration confirmation information to the general executor, wherein the secure communicator performs the secure communication with the secure executor that runs a service execution monitor by establishing a secure communication channel with the secure executor or by performing data encryption, and wherein when a data storage request is received from the secure executor, the secure communicator transmits the data, which is encrypted using a public key of the secure executor, to the secure executor.

6. A method for providing a secure execution environment for a mobile cloud, comprising:

transmitting, by a general executor of a secure execution environment provision apparatus installed in a user terminal, authentication information that includes secure authentication information and general authentication information to a cloud server;

individually verifying, by the cloud server, the general executor and a secure executor of the secure execution environment provision apparatus, based on the authentication information;

transmitting, by the cloud server, a security key required for secure communication to the secure executor through the general executor when verification of the general executor and the secure executor succeeds;

verifying, by the secure executor, the security key and running a service execution monitor; and providing, by the cloud server, a service by performing the secure communication with the secure executor that runs the service execution monitor, wherein the general authentication information corresponds to the general executor and is generated by the general executor, and the secure authentication information is generated by the secure executor, and wherein the method further comprises:

generating, by the general executor, executor information that includes secure executor information received from the secure executor and general executor information corresponding to the general executor;

transmitting, by the general executor, registration request information including the executor information to the cloud server; and receiving, by the general executor, registration confirmation information from the cloud server that has completed registration of the secure execution environment provision apparatus, wherein the method further comprises:

requesting, by the secure executor, the cloud server to store data;

receiving, by the secure executor, encrypted data from the cloud server; and decrypting and storing, by the secure executor, the encrypted data, wherein the method further comprises:

receiving, by the secure executor, the registration confirmation information from the general executor;

decrypting, by the secure executor, a passcode included in the registration confirmation information; and re-encrypting and storing, by the secure executor, the passcode, and wherein the secure authentication information includes the passcode encrypted using a public key of the cloud server.

7. The method of claim 6, further comprising:

validating, by the secure executor, a user authentication code received from the general executor; and displaying, by the secure executor, the data by running a file viewer when validation of the user authentication code succeeds.

8. The method of claim 6, wherein the service is a smart-work service provided by the cloud server.

9. The method of claim 6, wherein the cloud server performs general communication with the general executor and performs the secure communication with the secure executor by establishing a secure communication channel with the secure executor or by performing data encryption.

10. The method of claim 6, wherein the secure execution environment provision apparatus displays a screen corresponding to any one of the general executor and the secure executor based on whether the service execution monitor is running.

* * * * *